United States Patent
Maruo et al.

(10) Patent No.: US 10,006,351 B2
(45) Date of Patent: Jun. 26, 2018

(54) CONTROL APPARATUS FOR INTERNAL COMBUSTION ENGINE AND CONTROL METHOD FOR INTERNAL COMBUSTION ENGINE

(71) Applicants: Mitsubishi Electric Corporation, Tokyo (JP); MAZDA MOTOR CORPORATION, Hiroshima (JP)

(72) Inventors: Toshiaki Maruo, Hyogo (JP); Takahiko Ono, Hyogo (JP); Takafumi Nishio, Hiroshima (JP)

(73) Assignees: Mitsubishi Electric Corporation, Tokyo (JP); MAZDA MOTOR CORPORATION, Hiroshima (JP)

( * ) Notice: Subject to any disclaimer, the term of this patent is extended or adjusted under 35 U.S.C. 154(b) by 115 days.

(21) Appl. No.: 15/262,153

(22) Filed: Sep. 12, 2016

(65) Prior Publication Data
US 2017/0184012 A1 Jun. 29, 2017

(30) Foreign Application Priority Data
Dec. 24, 2015 (JP) ................................ 2015-251146

(51) Int. Cl.
*F02B 37/18* (2006.01)
*F02D 23/00* (2006.01)
*F02D 41/00* (2006.01)
*F02D 41/14* (2006.01)

(52) U.S. Cl.
CPC ............ *F02B 37/186* (2013.01); *F02B 37/18* (2013.01); *F02D 23/00* (2013.01); *F02D 41/0007* (2013.01); *F02D 2041/1409* (2013.01); *F02D 2200/0406* (2013.01); *Y02T 10/144* (2013.01)

(58) Field of Classification Search
CPC ........ F02B 37/186; F02B 37/18; F02D 23/00; F02D 41/0007; F02D 2041/1409; F02D 2200/0406; Y02T 10/144
USPC ............................. 60/600, 602, 605.1, 605.2
See application file for complete search history.

(56) References Cited

U.S. PATENT DOCUMENTS

| 2014/0350824 | A1* | 11/2014 | Nakao | F02D 29/02 701/112 |
| 2015/0337718 | A1* | 11/2015 | Saeki | F02D 41/0007 60/602 |
| 2016/0319755 | A1* | 11/2016 | Wanibe | F02D 41/0007 |

FOREIGN PATENT DOCUMENTS

| JP | 2015-059549 A | 3/2015 |
| JP | 2015-124691 A | 7/2015 |
| JP | 2015-166571 A | 9/2015 |

* cited by examiner

*Primary Examiner* — Hoang Nguyen
(74) *Attorney, Agent, or Firm* — Sughrue Mion, PLLC; Richard C. Turner (57) ABSTRACT

A controller is provided, which detects operating conditions of an internal combustion engine on the basis of detection results from a group of sensors and drives an actuator that modifies an opening position of a wastegate valve on the basis of the operating conditions. When driving the wastegate valve to a fully closed opening, the controller initially drives the actuator toward a preset provisional fully closed position, and after determining on the basis of a detection result from a position sensor that an actual opening of the wastegate valve has reached the provisional fully closed opening, switches a target opening to the fully closed opening and drives the actuator accordingly.

18 Claims, 6 Drawing Sheets

TARGET SUPERCHARGING PRESSURE MAP

| ACCELERATOR OPENING [%] | ENGINE ROTATION SPEED [r/min] | | | | | |
|---|---|---|---|---|---|---|
| | 1000 | 2000 | 3000 | 4000 | 5000 | 6000 |
| 10 | 100 | 100 | 100 | 100 | 100 | 100 |
| 20 | 100 | 100 | 100 | 100 | 120 | 120 |
| 30 | 100 | 100 | 100 | 100 | 120 | 140 |
| 40 | 120 | 120 | 120 | 120 | 140 | 180 |
| 50 | 120 | 140 | 140 | 120 | 160 | 180 |
| 60 | 120 | 140 | 140 | 140 | 160 | 200 |
| 70 | 120 | 160 | 180 | 180 | 200 | 200 |
| 80 | 120 | 160 | 180 | 180 | 220 | 200 |
| 90 | 140 | 180 | 200 | 200 | 220 | 240 |
| 100 | 140 | 200 | 220 | 220 | 240 | 240 |

CONTROL APPARATUS FOR INTERNAL COMBUSTION ENGINE AND CONTROL METHOD FOR INTERNAL COMBUSTION ENGINE

BACKGROUND OF THE INVENTION

1. Field of the Invention

The present invention relates to a control apparatus and a control method for an internal combustion engine having a turbocharger, and more particularly to control of an exhaust bypass valve such as a wastegate valve.

2. Description of the Related Art

A turbocharger installed with an exhaust turbocharger that is operated by rotating a turbine using exhaust gas is available as conventional means for improving the output of an internal combustion engine (referred to as an engine hereafter) and so on.

In this type of turbocharger, when the engine performs a high rotation/high load operation, a supercharging pressure may increase excessively, and as a result, the engine may be damaged. Therefore, an exhaust bypass passage is normally provided parallel to the turbine.

A control apparatus for an internal combustion engine having the turbocharger and exhaust bypass passage described above adjusts an amount of exhaust gas flowing into the turbine by diverting a part of exhaust gas flowing through an exhaust gas passage to the exhaust bypass passage using a wastegate valve provided in the bypass passage. As a result, the supercharging pressure, i.e. the pressure in an intake passage of the engine, can be controlled to an appropriate value.

The wastegate valve is operated to open and close by driving a positive pressure actuator, for example. More specifically, the wastegate valve is configured such that an opening thereof is adjusted by driving the positive pressure actuator particularly in an operating condition where the pressure in a part of the intake passage upstream of a throttle valve used to increase the pressure is higher than atmospheric pressure.

In a period before the positive pressure actuator can be driven, the wastegate valve is normally fully closed. Note that hereafter, the wastegate valve will be referred to as a WGV, and a wastegate valve actuator for operating the WGV will be referred to as a WGA.

The positive pressure actuator can operate the WGV only when the pressure in the intake passage of the engine is higher than a threshold. In other words, when the pressure in the intake passage of the engine is equal to or lower than the threshold, the WGV cannot be operated, and therefore the opening of the WGV cannot be modified.

Hence, a system in which the WGA is electrified so that the WGV can be driven as required, regardless of the pressure in the intake passage of the engine, has recently been proposed so that turbocharging by the turbocharger can be limited more freely.

In this system, however, an error arises between a detection value of a WGV opening sensor and a true WGV opening due to factors such as temporal variation occurring as the WGV is opened and closed repeatedly for a long period of time, a temperature characteristic of the WGV opening sensor, and thermal expansion of structures constituting the WGV.

As a result, a "reference position of the WGV", which corresponds to a position of the WGV when the detection value of the WGV opening sensor is 0%, deviates from a "fully closed position of the WGV", which corresponds to the position of the WGV the when the true WGV opening is 0%.

Hence, a deviation may occur in the WGV opening even when the WGA is operated by identical operation amounts, and as a result, it may be impossible to control the WGV to a desired open/closed condition. Moreover, the supercharging pressure may not reach a control target value, or conversely, control may be executed to attempt to operate the WGV further toward the closed side from a fully closed condition, causing a drive current of the WGA to form an overcurrent.

In a conventional technique proposed in response to this problem, when the WGV converges on the fully closed position, the fully closed position is learned on the basis of an output value of the opening sensor at that time (see Japanese Patent Application Publication No. 2015-59549, for example). According to Japanese Patent Application Publication No. 2015-59549, in a situation where there are few opportunities for learning or the WGV does not converge on the fully closed position, the learned fully closed value is corrected to a value taking into account variation in a sensor output characteristic in accordance with temperature variation occurring from the point at which the learned fully closed value is updated. As a result, with Japanese Patent Application Publication No. 2015-59549, control precision can be maintained with stability in a WGV mechanism even when a temperature condition varies.

SUMMARY OF THE INVENTION

However, the prior art includes the following problems.

In a conventional apparatus such as that of Japanese Patent Application Publication No. 2015-59549, an error arising between the detection value of the WGV opening sensor and the true WGV opening, as described above, can be reduced by correcting the perception gap in the fully closed position due to temperature variation.

However, Japanese Patent Application Publication No. 2015-59549 does not take into account the effect of characteristic variation among individual sensors and WGVs, and therefore the error cannot be corrected completely. Hence, a situation in which the true WGV opening is in the fully closed position even though the detection value of the WGV opening sensor does not indicate the fully closed position may occur.

When, during control executed in this case, the WGA is driven at high speed using the fully closed position as the target opening, the WGV crashes suddenly into the true fully closed position.

Moreover, the speed at which the WGV is driven to the fully closed position may exceed a collision limit speed of the WGV so that the WGV collides with a valve seat, and as a result, members of movable portions may quickly become worn or fatigued. Furthermore, when the WGV collides with the valve seat at high speed, unpleasant collision noise may be generated.

In other words, in consideration of the error between the detection value of the WGV opening sensor and the true WGV opening, control is required to ensure that the WGV drive speed does not exceed the collision limit speed at or below an opening that may correspond to the fully closed position. However, Japanese Patent Application Publication No. 2015-59549 does not solve the problems of wear and fatigue in the members of the movable portions, collision noise, and so on, which occur when the WGV collides with the valve seat at high speed.

Incidentally, when the WGV is driven to the fully closed position, the WGV must be pushed onto the valve seat by a driving force that can overcome exhaust pressure to ensure that the WGV is not pushed by the exhaust pressure and incompletely closed as a result. In other words, when a full closing pushing force exerted on the WGV is weak, either the WGV is pushed by the exhaust pressure, with the result that the WGV cannot be maintained in the fully closed condition, or the WGV opening oscillates due to pulsation in the exhaust pressure.

Therefore, to ensure that the WGV can be maintained reliably in the fully closed condition, control must be executed using a minimum value at which the exhaust pressure can be overcome as a WGA operation amount.

However, the exhaust pressure varies according to operating conditions, and therefore the minimum operation amount at which the exhaust pressure can be overcome also varies according to the operating conditions. Hence, when an operation amount envisaging maximum conditions is set at all times, the WGV is pushed excessively.

When the WGV is pushed excessively to the fully closed position, an excessive current may be passed through the WGA such that power is used wastefully, and moreover, a motor may be overheated by the overcurrent.

Furthermore, when the WGV is pushed excessively, a link mechanism linking the WGA to the WGV may bend, causing an actual valve position to deviate from a value of a sensor that outputs the WGA operation amount.

Hence, control is required to set the WGA operation amount within an optimum range to ensure that the WGV can be maintained reliably in the fully closed condition without being pushed excessively to the fully closed position. However, Japanese Patent Application Publication No. 2015-59549 does not solve the problems of an excessive current being passed through the WGA and overheating of the motor, which occur when the WGV is pushed excessively.

The present invention has been designed in consideration of the circumstances described above, and an object thereof is to obtain a control apparatus for an internal combustion engine and a control method for an internal combustion engine with which a full closing operation can be performed reliably on a WGV while ensuring that the WGV does not crash into a fully closed position at high speed, and with which a motor can be prevented from overheating abnormally due to an excessive WGA drive current.

A control apparatus for an internal combustion engine according to the present invention includes: a turbocharger that has a turbine provided in an exhaust passage of the internal combustion engine and a compressor provided in an intake passage of the internal combustion engine so as to rotate integrally with the turbine; a wastegate valve that is provided in an exhaust bypass passage connecting an upstream side to a downstream side of the turbine so as to adjust a flow rate of exhaust gas from the internal combustion engine as the exhaust gas flows through the exhaust bypass passage; an actuator that is driven to modify an opening position of the wastegate valve; a position sensor that detects the opening position of the wastegate valve; a supercharging pressure sensor that detects an actual supercharging pressure, which is an actual value of a pressure of intake air compressed by the compressor; and a controller that detects an operating condition of the internal combustion engine on the basis of detection results from a group of sensors including the position sensor and the supercharging pressure sensor, and controls the actual supercharging pressure by driving the actuator on the basis of the operating condition, wherein the controller, when driving the wastegate valve to a fully closed opening, initially drives the actuator toward a preset provisional fully closed opening, and after determining on the basis of the detection result from the position sensor that an actual opening of the wastegate valve has reached the provisional fully closed opening, switches a target opening to the fully closed opening and drives the actuator accordingly.

Further, a control method for an internal combustion engine according to the present invention is executed by an actuator operation amount calculation unit of a control apparatus for the internal combustion engine, the control apparatus including: a turbocharger that has a turbine provided in an exhaust passage of the internal combustion engine and a compressor provided in an intake passage of the internal combustion engine so as to rotate integrally with the turbine; a wastegate valve that is provided in an exhaust bypass passage connecting an upstream side to a downstream side of the turbine so as to adjust a flow rate of exhaust gas from the internal combustion engine as the exhaust gas flows through the exhaust bypass passage; an actuator that is driven to modify an opening position of the wastegate valve; a position sensor that detects the opening position of the wastegate valve; a supercharging pressure sensor that detects an actual supercharging pressure, which is an actual value of a pressure of intake air compressed by the compressor; a target supercharging pressure calculation unit that calculates a target supercharging pressure, which is a target value of the pressure of the intake air compressed by the compressor, on the basis of an operating condition of the internal combustion engine; an engine-required target opening calculation unit that calculates an engine-required target opening of the wastegate valve, which is required to align the actual supercharging pressure with the target supercharging pressure; an actual opening calculation unit that sets an operating position, in which the wastegate valve completely blocks the exhaust bypass passage, as a reference position of the wastegate valve, and converts the operating position of the wastegate valve, detected by the position sensor, into an actual opening of the wastegate valve on the basis of the reference position; the actuator operation amount calculation unit, which calculates an actuator operation amount on the basis of comparison results of magnitude relationships obtained by comparing the engine-required target opening and the actual opening respectively with a preset provisional fully closed opening; and an actuator driving unit that outputs the actuator operation amount to the actuator, the control method including: a first step for setting the provisional fully closed opening in advance as an opening obtained by converting an upper limit position of a variation range of the operating position in which the wastegate valve completely blocks the exhaust bypass passage on the basis of the reference position; a second step for determining whether or not a first condition, in which the engine-required target opening is not greater than the provisional fully closed opening and the actual opening is greater than the provisional fully closed opening, is established; a third step for calculating, as the actuator operation amount, an operation amount required to align the actual opening with the provisional fully closed opening on the basis of the provisional fully closed opening and the actual opening during a period in which the first condition is determined to be established in the second step; a fourth step for determining whether or not a second condition, in which the engine-required target opening is not greater than the provisional fully closed opening and the actual opening is not greater than the provisional fully closed opening, is established; and a fifth step for calculating, as the actuator operation amount, an operation amount required to align the actual opening with the engine-required target opening on the basis of the engine-required target opening and the actual opening during a period in which the second condition is determined to be established in the fourth step.

The control apparatus for an internal combustion engine according to the present invention is configured to drive the WGV to the fully closed position by initially driving the WGA in the direction of the preset provisional fully closed opening, and once the speed of the WGV has decreased after the actual opening reaches the provisional fully closed opening, switching the target opening to the fully closed position and reaccelerating the WGV. As a result, it is possible to obtain a control apparatus for an internal combustion engine and a control method for an internal combustion engine with which the WGV can be prevented from crashing into the fully closed position when driven at a high speed exceeding the collision limit speed, a full closing operation can be performed reliably on the WGV while ensuring that the WGV does not crash into the fully closed position at high speed, and the motor can be prevented from overheating abnormally due to an excessive WGA drive current.

DESCRIPTION OF THE PREFERRED EMBODIMENTS

A preferred embodiment of a control apparatus for an internal combustion engine and a control method for an internal combustion engine according to the present invention will be described below using the drawings.

First Embodiment

Figure 1:
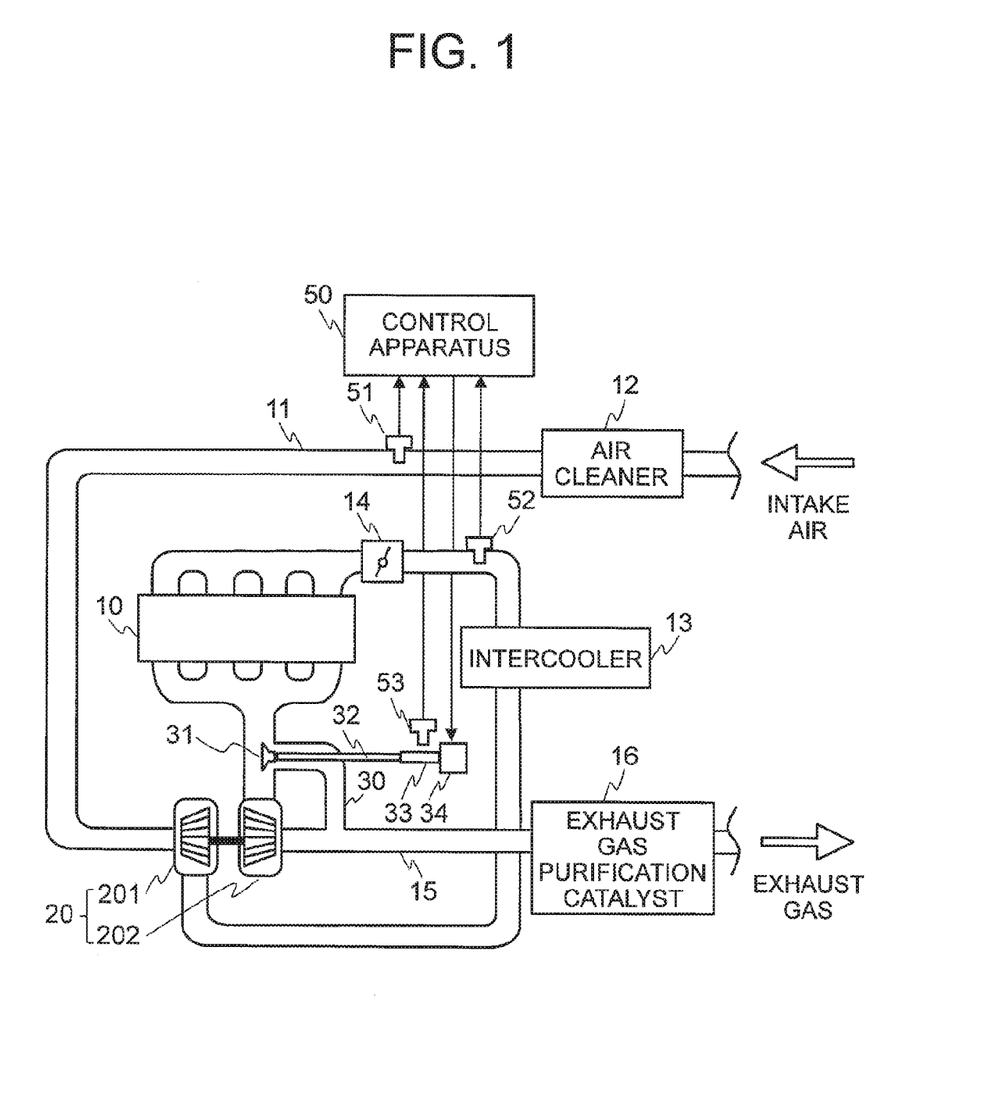
FIG. 1 is a system diagram showing a configuration of an engine to which a control apparatus for an internal combustion engine according to a first embodiment of the present invention is applied.

FIG. 1 is a system diagram showing a configuration of an engine to which a control apparatus for an internal combustion engine according to a first embodiment of the present invention is applied. In FIG. 1, an air cleaner 12 is attached to an inlet of an intake passage 11 of an engine 10. An air flow sensor 51 for detecting an intake air amount is provided on a downstream side of the air cleaner 12.

A turbocharger 20 is provided on a downstream side of the air flow sensor 51. The turbocharger 20 includes a compressor 201 and a turbine 202. The compressor 201 and the turbine 202 are connected integrally by a connecting shaft. The compressor 201 is driven to rotate by energy from exhaust gas input into the turbine 202.

An intercooler 13 is disposed on a downstream side of the compressor 201 in order to cool compressed air. A throttle valve 14 is disposed on a downstream side of the intercooler 13.

Note that a supercharging pressure sensor 52 is provided between the intercooler 13 and the throttle valve 14 in order to detect the pressure of intake air supercharged by the turbocharger 20.

Further, an exhaust system of the engine 10 includes an exhaust passage 15. The turbine 202 of the turbocharger 20 described above is provided midway on the exhaust passage 15. An exhaust bypass passage 30 that connects an inlet side and an outlet side of the turbine 202 while bypassing the turbine 202 is also provided on the exhaust passage 15.

A WGV 31 is disposed in the exhaust bypass passage 30 as an exhaust bypass valve. Further, an exhaust gas purification catalyst 16 for purifying the exhaust gas is disposed on a downstream side of the turbine 202.

The WGV 31 disposed in the exhaust bypass passage 30 is mechanically connected to one end of a joint member 32. Another end of the joint member 32 is mechanically connected to an output shaft 33 (a WGA output shaft 33) of a WGA 34 serving as an exhaust bypass valve driving apparatus. A position sensor 53 for detecting position information correlating to an opening position of the WGV 31 is provided in the vicinity of the WGA output shaft 33.

Note that in the first embodiment, the position sensor 53 is provided separately to the WGA 34, but the position sensor 53 may be built into the WGA 34.

The control apparatus for an internal combustion engine according to the first embodiment includes a control apparatus (a controller) 50. A sensor group constituted by the air flow sensor 51, the supercharging pressure sensor 52, the position sensor 53, and various other sensors such as a crank angle sensor and a throttle opening sensor, not shown in the drawing, is connected to an input portion of the control apparatus 50 in order to detect operating conditions of the engine 10.

Meanwhile, the WGA 34 and various other actuators such as an igniter and an ignition coil, not shown in the drawing, are connected to an output portion of the control apparatus 50 in order to control the operating conditions of the engine 10.

The control apparatus 50 controls a combustion condition and an output torque of the engine 10 to optimum levels by driving the various actuators described above on the basis of the various input information described above.

Figure 2:
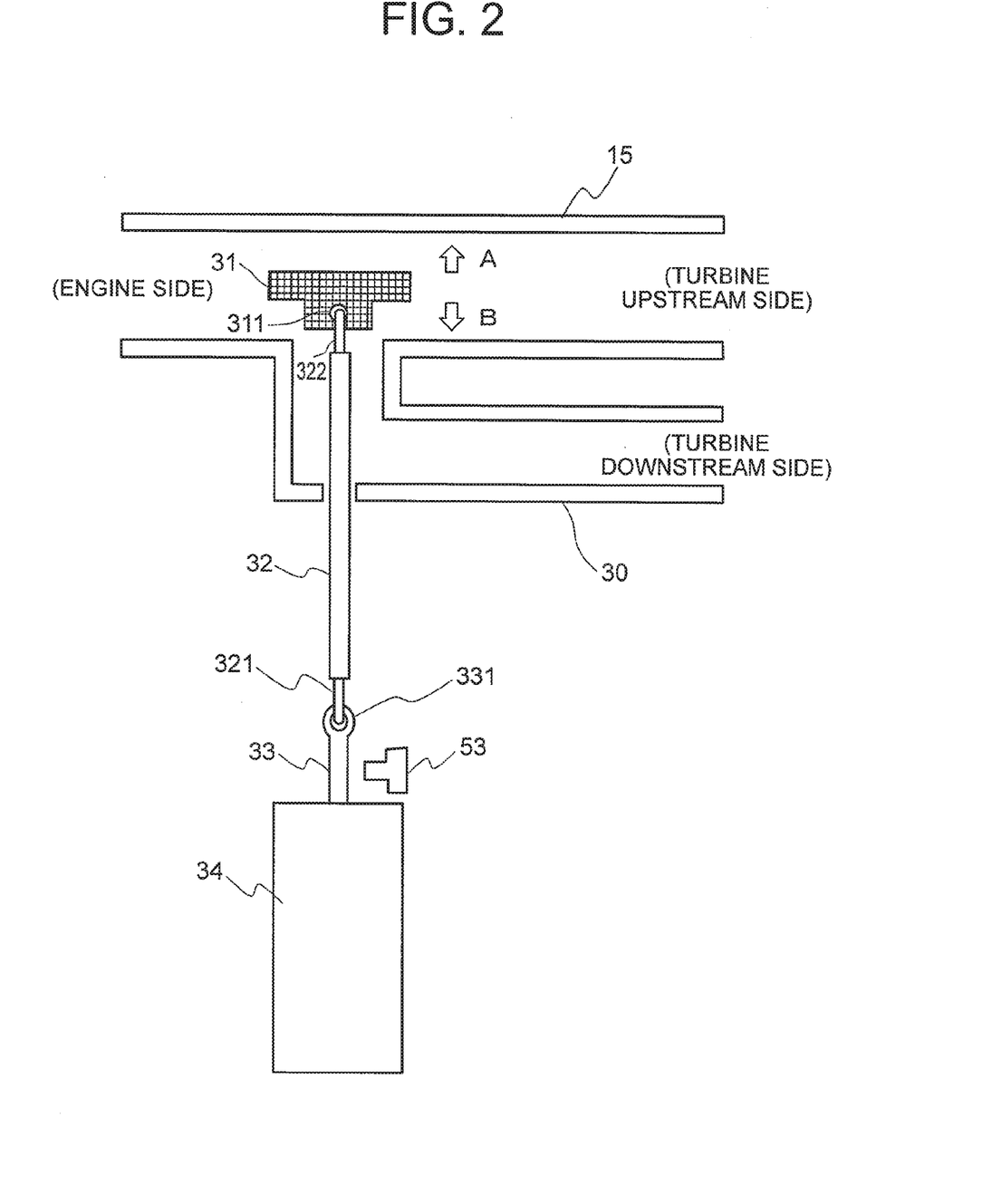
FIG. 2 is a pattern diagram illustrating mechanical connections between a WGV and a WGA in the engine to which the control apparatus for an internal combustion engine according to the first embodiment of the present invention is applied.

Next, mechanical connections between the WGV 31 and the WGA 34 will be described in detail. FIG. 2 is a pattern diagram illustrating the mechanical connections between the WGV 31 and the WGA 34 in the engine 10 to which the control apparatus for an internal combustion engine according to the first embodiment of the present invention is applied.

In FIG. 2, the WGV 31 and the WGA 34 are connected via the joint member 32 rather than being connected directly. More specifically, a ring-shaped WGA output shaft engagement portion 331 formed on a tip end portion of the WGA output shaft 33 and a ring-shaped first joint member engagement portion 321 formed on one end of the joint member 32 are engaged so as to be free to swing by being passed through each other.

Meanwhile, a WGV engagement portion 311 that is provided in the WGV 31 and includes a through hole and a ring-shaped second joint member engagement portion 322 formed on the other end of the joint member 32 are engaged so as to be free to swing by passing the second joint member engagement portion 322 through the through hole in the WGV engagement portion 311.

The WGV 31, being disposed in the exhaust passage 15, is exposed to the exhaust gas discharged from the engine 10 and therefore remains in a high temperature condition of several hundred degrees. Hence, in consideration of the heat resistance of the WGA 34, which includes inbuilt electronic components such as a motor, the WGA 34 cannot be disposed in the vicinity of the WGV 31. Accordingly, the joint member 32 is interposed between the WGV 31 and the WGA 34, as shown in FIG. 2, to ensure that the WGA 34 does not reach an excessively high temperature.

Another reason for interposing the joint member 32 is that by mechanically connecting the WGA 34 to the WGV 31 via the joint member 32, the position in which the WGA 34 is installed in a vehicle can be selected more freely, thereby facilitating layout.

A motor capable of normal and reverse rotation is built into the WGA 34, and the WGA 34 includes the WGA output shaft 33 to convert a rotary motion of the motor into a linear motion and output the linear motion. The WGA output shaft 33 is capable of moving in an axial direction in accordance with an energization direction of the motor. By energizing the motor in a direction for pushing the WGA output shaft 33 toward an outer side of the WGA 34, the WGV 31 can be moved to a valve opening side (a direction of an arrow A in FIG. 2) via the joint member 32.

Conversely, by energizing the motor in a direction for pulling the WGA output shaft 33 toward an inner side of the WGA 34, the WGV 31 can be moved to a valve closing side (a direction of an arrow B in FIG. 2) via the joint member 32.

Further, the position sensor 53 is provided in the vicinity of a side portion of the WGA output shaft 33. An axial direction position of the WGA output shaft 33 is detected by the position sensor 53 and taken into the control apparatus 50 as an operating position of the WGV 31, or in other words an open position, a closed position, or an intermediate position of the WGV 31.

Figure 3:
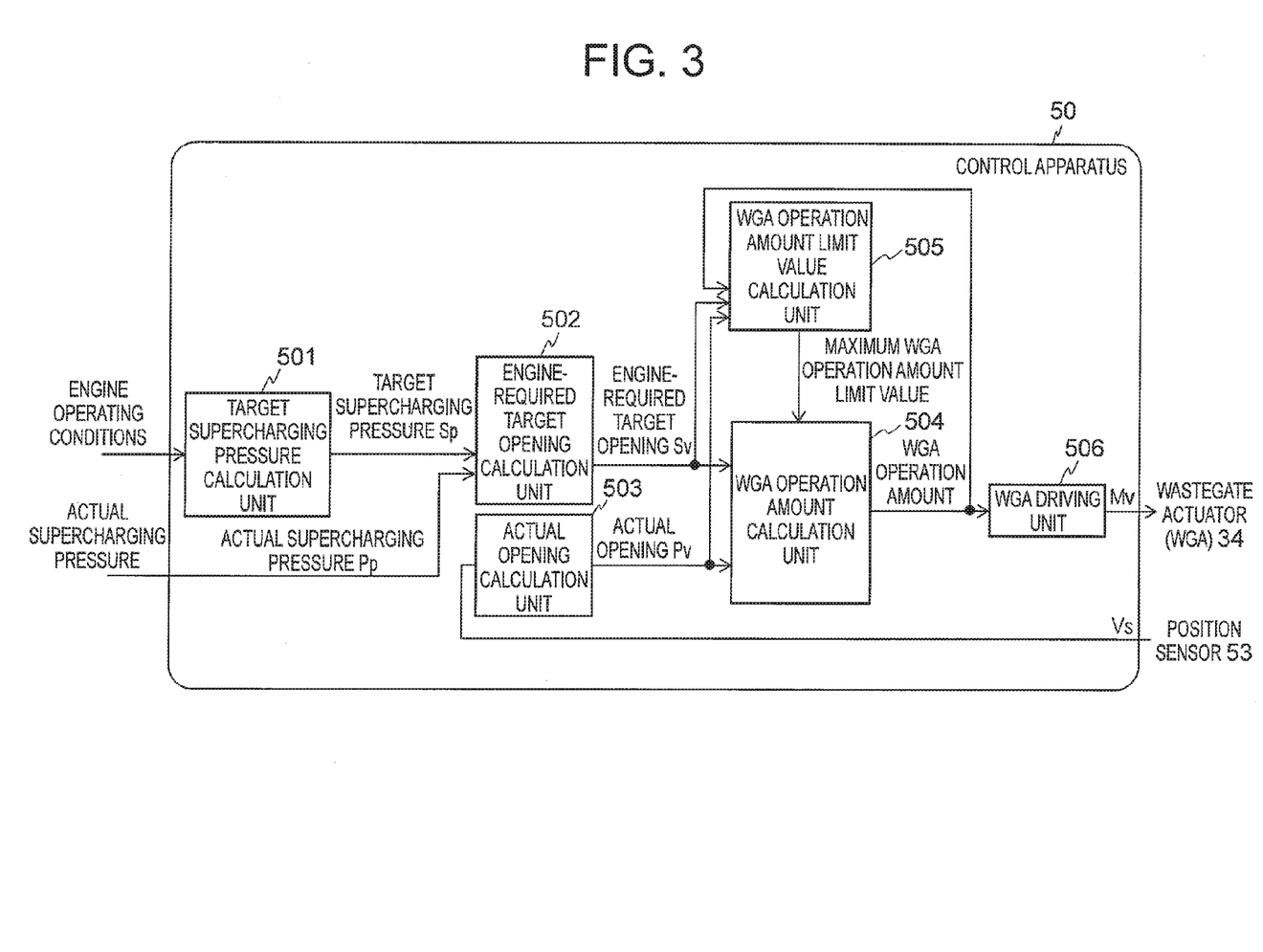
FIG. 3 is a block diagram showing the control apparatus for an internal combustion engine according to the first embodiment of the present invention.

FIG. 3 is a block diagram showing the control apparatus for an internal combustion engine according to the first embodiment of the present invention. On the basis of FIG. 3, first, configurations and operations relating to basic control of the WGV 31 will be described.

The control apparatus 50 performs overall control of the engine 10 on the basis of detection results from the various sensors described above. The control apparatus 50 includes, as control units for controlling the WGV 31, a target supercharging pressure calculation unit 501, an engine-required target opening calculation unit 502, an actual opening calculation unit 503, a WGA operation amount calculation unit 504, a WGA operation amount limit value calculation unit 505, and a WGA driving unit 506.

The target supercharging pressure calculation unit 501 obtains a plurality of information indicating the operating conditions of the engine 10, such as an engine rotation speed, an intake air amount detected by the air flow sensor 51, and the supercharging pressure detected by the supercharging pressure sensor 52, and sets a target supercharging pressure Sp as a target control value on the basis of this information indicating the engine operating conditions.

Figure 4:
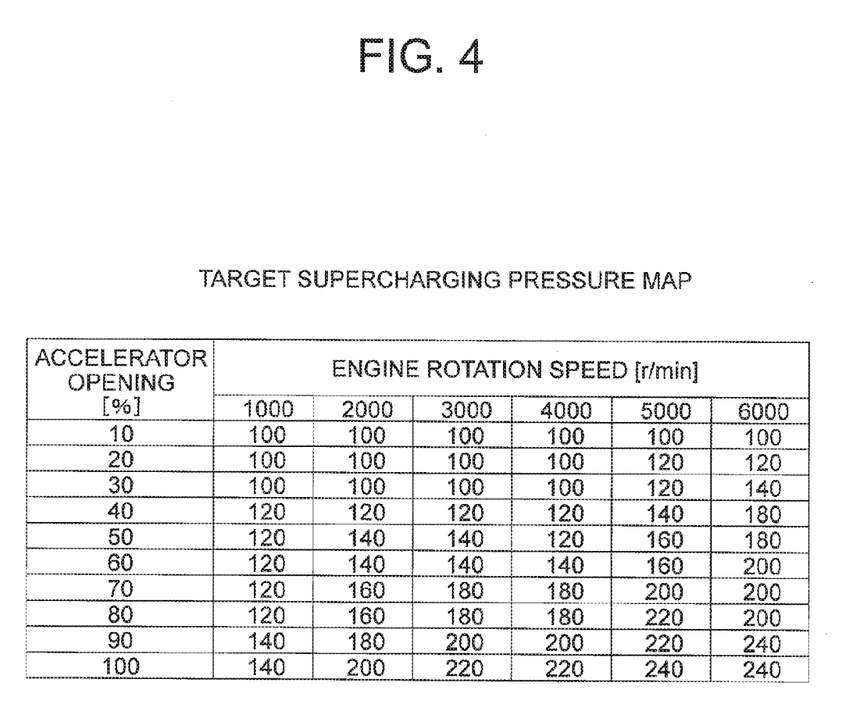
FIG. 4 is a view showing an example of a map used by the control apparatus for an internal combustion engine according to the first embodiment of the present invention to determine a target supercharging pressure.

Here, an example of a method employed by the target supercharging pressure calculation unit 501 to calculate the target supercharging pressure will be described more specifically with reference to a map shown in FIG. 4. FIG. 4 is a view showing an example of a map used by the control apparatus for an internal combustion engine according to the first embodiment of the present invention to determine the target supercharging pressure. Note that on the map shown in FIG. 4, [kPa] is used as a unit of the target supercharging pressure.

On the target supercharging pressure map, as shown in FIG. 4, the target supercharging pressure [kPa] is associated with the engine rotation speed [r/min] and an accelerator opening [%]. The target supercharging pressure calculation unit 501 determines the target supercharging pressure in accordance with the engine rotation speed and the accelerator opening by referring to the map.

For example, a specific case in which the engine rotation speed is 2000 [r/min] and the accelerator opening is 50 [%] will be envisaged. In these operating conditions, the target supercharging pressure calculation unit 501 sets the target supercharging pressure at 140 [kPa] in accordance with the map.

Note that instead of using a target supercharging pressure map such as that shown in FIG. 4, the target supercharging pressure calculation unit 501 may determine the target supercharging pressure by calculation using a physical model defined in advance, for example.

The engine-required target opening calculation unit 502 obtains the target supercharging pressure Sp calculated by the target supercharging pressure calculation unit 501 and an actual supercharging pressure Pp, and calculates an engine-required target opening Sv required to align the actual supercharging pressure Pp with the target supercharging pressure Sp.

The actual opening calculation unit 503 obtains a voltage Vs detected by the position sensor 53, sets an operating position in which the WGV 31 completely blocks the exhaust bypass passage 30 as a reference position of the WGV, and calculates an actual opening Pv on the basis of this information.

Note that instead of using a preset position as the reference position of the WGV, a position obtained by performing a full closing operation, in which the WGV is driven to abut the fully closed position, and learning the fully closed position, for example, may be used.

The WGA operation amount calculation unit 504 obtains the engine-required target opening Sv calculated by the engine-required target opening calculation unit 502, the actual opening Pv calculated by the actual opening calculation unit 503, and a maximum WGA operation amount limit value calculated by the WGA operation amount limit value calculation unit 505, to be described below, and calculates the WGA operation amount.

More specifically, the WGA operation amount calculation unit 504 executes three following operation amount calculations in accordance with conditions.

Calculation 1

When a first condition, in which the engine-required target opening Sv is not greater than a provisional fully closed opening and the actual opening Pv is greater than the provisional fully closed opening, is established, a WGA operation amount required to align the actual opening Pv with the provisional fully closed opening is calculated on the basis of the provisional fully closed opening and the actual opening Pv.

Calculation 2

When a second condition, in which the engine-required target opening Sv is not greater than the provisional fully closed opening and the actual opening Pv is not greater than the provisional fully closed opening, is established, a WGA operation amount required to align the actual opening Pv with the engine-required target opening Sv is calculated on the basis of the engine-required target opening Sv and the actual opening Pv.

Calculation 3

Further, when the maximum operation amount limit value calculated by the WGA operation amount limit value calculation unit 505, to be described below, is input in relation to the WGA operation amount required to align the actual opening Pv with the engine-required target opening Sv, a WGA operation amount limited by the maximum WGA operation amount limit value is output to the WGA driving unit 506.

The WGA operation amount limit value calculation unit 505 obtains the engine-required target opening Sv, the actual opening Pv, and the WGA operation amount, described above, in order to calculate the maximum WGA operation amount limit value, and outputs the calculated maximum WGA operation amount limit value to the WGA operation amount calculation unit 504.

More specifically, the WGA operation amount limit value calculation unit 505 calculates the maximum WGA operation amount limit value on the basis of the WGA operation amount at a point where the first condition, in which "the engine-required target opening Sv is not greater than the provisional fully closed opening and the actual opening Pv is greater than the provisional fully closed opening", switches to the second condition, in which "the engine-required target opening Sv is not greater than the provisional fully closed opening and the actual opening Pv is not greater than the provisional fully closed opening", and outputs the calculated maximum WGA operation amount limit value to the WGA operation amount calculation unit 504.

The WGA driving unit 506 obtains the WGA operation amount from the WGA operation amount calculation unit 504, and drives the WGA 34 on the basis of this information.

Next, operations performed in relation to the target opening of the WGV, the actual opening of the WGV, and the WGA operation amount when the engine-required target opening Sv varies from the vicinity of a fully open position of the WGV to the fully closed position, for example, will be described on the basis of a time chart shown in FIG. 5.

Figure 5:
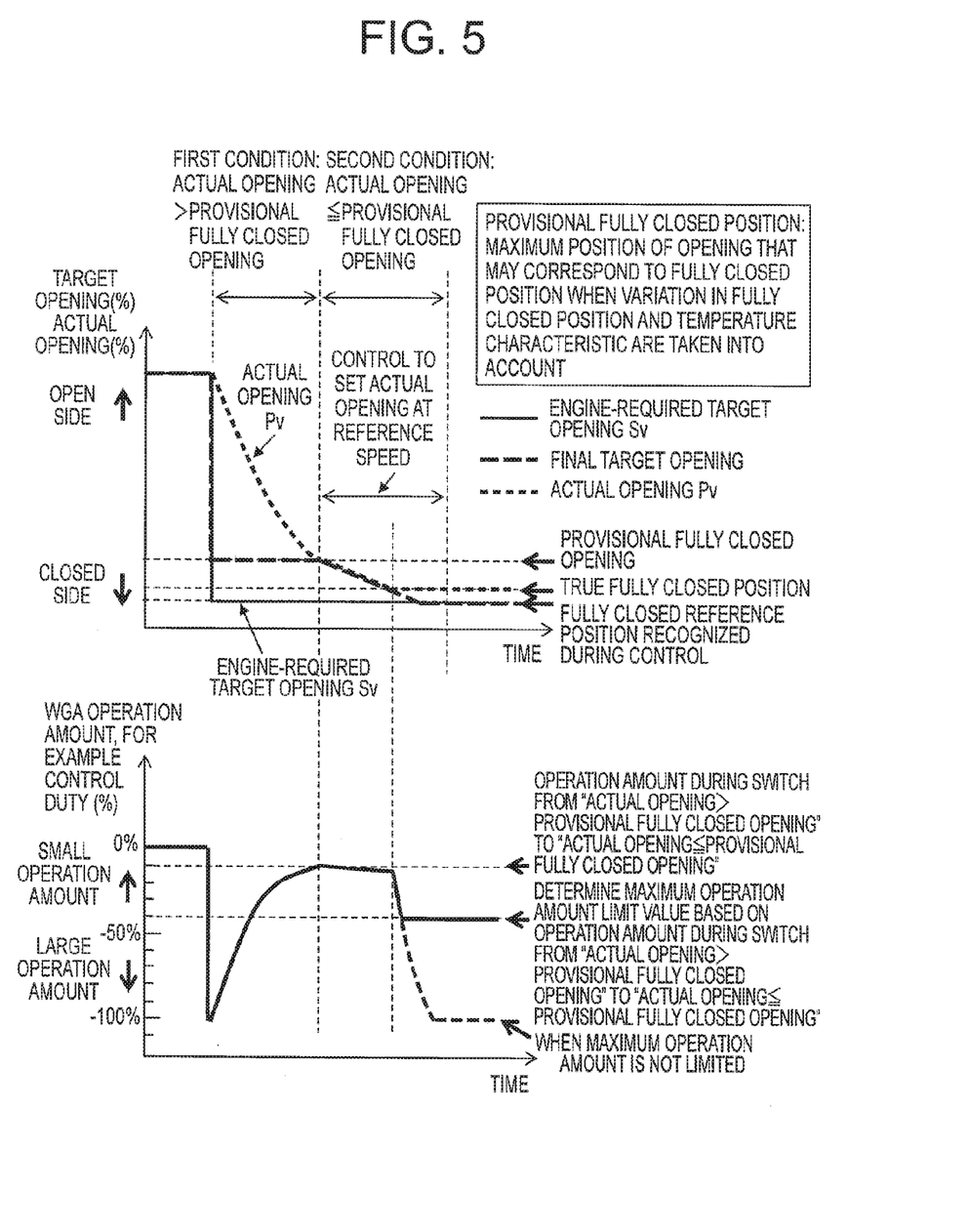
FIG. 5 is a time chart showing operations performed by the control apparatus for an internal combustion engine according to the first embodiment of the present invention in relation to a target opening of the WGV, an actual opening of the WGV, and a WGA operation amount.

FIG. 5 is a time chart showing operations performed by the control apparatus for an internal combustion engine according to the first embodiment of the present invention in relation to the target opening of the WGV, the actual opening of the WGV, and the WGA operation amount. Note that processing shown on the time chart in FIG. 5 is executed by the control apparatus 50 as interrupt processing at preset time intervals.

First, in a condition where the engine-required target opening Sv is set in the vicinity of the fully open position of the WGV, the WGA operation amount is substantially zero. When a motor energization amount is controlled using a drive voltage duty, this control condition corresponds to a duty of approximately 0%. In this control condition, therefore, no driving force need be applied by the motor to either the opening side or the closing side, and the actual opening Pv is controlled to the engine-required target opening Sv.

Next, when the engine-required target opening Sv varies to the closed side such that the first condition, in which "the engine-required target opening Sv is not greater than the provisional fully closed opening and the actual opening Pv is greater than the provisional fully closed opening", is established, the WGA is driven by feedback control on the basis of the provisional fully closed opening and the actual opening Pv so that the actual opening Pv is aligned with the provisional fully closed opening.

During this period, the WGA operation amount takes a large value while a deviation between the actual opening Pv and the provisional fully closed opening remains large, and decreases as the actual opening Pv approaches the provisional fully closed opening. At the point where the actual opening Pv reaches the provisional fully closed opening, the WGA operation amount is set such that a force for pushing the WGV to the closed side and a force by which the exhaust pressure of the exhaust gas attempts to push the WGV back to the open side are counterbalanced.

Note that in this counterbalanced condition, the WGA operation amount varies according to the operating conditions. More specifically, the WGA operation amount varies in accordance with the condition of the exhaust pressure so as to increase as the exhaust pressure increases and decrease as the exhaust pressure decreases.

Once the second condition, in which "the engine-required target opening Sv is not greater than the provisional fully closed opening and the actual opening Pv is not greater than the provisional fully closed opening", is established, the WGA is driven by feedback control on the basis of the engine-required target opening Sv and the actual opening Pv so that the actual opening Pv is aligned with the engine-required target opening Sv.

Note, however, that at the point where the actual opening Pv falls to or below the provisional fully closed opening, the true opening may already be in the fully closed position. Hence, from this point, the control apparatus 50 controls the WGA such that the actual opening Pv shifts toward the engine-required target opening Sv at a preset reference speed to ensure that the WGV does not exceed a collision limit speed. During this period, the WGV gradually closes such that the effect of the exhaust pressure increases, and therefore the WGA operation amount is gradually increased.

Further, when the actual fully closed position of the WGV deviates toward the open side from the fully closed position perceived during the control due to temperature drift in the output characteristic of the position sensor 53 or the like, the true opening reaches the fully closed position before the actual opening Pv perceived during the control reaches the target opening. As a result, the output of the position sensor 53 no longer varies such that the deviation between the target opening and the actual opening Pv remains, and during this period, the WGA operation amount continues to be increased.

In this condition, the WGA is driven meaninglessly to the closed side even though the true opening is already in the fully closed position. Further, as the deviation between the target opening and the actual opening Pv increases, the WGA operation amount increases, and as a result, the WGA may be damaged by abnormal overheating.

In the first embodiment, to deal with such a case, the WGA operation amount is limited by the maximum operation amount limit value to ensure that the WGA operation amount is not increased excessively. As a result, power is not used wastefully when the WGV is pushed to the fully closed position, and moreover, the risk of abnormal overheating can be eliminated.

Further, by limiting the WGA operation amount by the maximum operation amount limit value after the output of the position sensor 53 stops varying, a situation in which a link mechanism linking the WGA to the WGV bends when the WGV is pushed excessively onto a valve seat such that a deviation occurs between the actual WGV operating position and a value obtained by a sensor that detects the WGA operation amount can be prevented.

Furthermore, as described above, the WGA operation amount at the point where the first condition switches to the second condition, or in other words the operation amount at the point where the force for pushing the WGV to the closed side and the force for returning the WGV to the open side are counterbalanced, varies according to the exhaust pressure, and therefore varies in response to variation in the operating conditions. More specifically, at low rotation, the exhaust pressure is low, and therefore the WGA operation amount at the point where the first condition switches to the second condition decreases, whereas at high rotation, the exhaust pressure is high, and therefore the WGA operation amount at the point where the first condition switches to the second condition increases.

Moreover, the operation amount required to drive the WGV to the fully closed position after reaching the provisional fully closed opening likewise varies according to the operating conditions such that the operation amount required to drive the WGV to the fully closed position decreases as the exhaust pressure decreases and increases as the exhaust pressure increases.

Therefore, when the maximum value of the operation amount is limited, the limit value differs according to the exhaust pressure. Hence, in the first embodiment, an optimum limit value can be set at all times in accordance with the operating conditions using an operation amount D at the point where the first condition switches to the second condition as a reference by setting the maximum operation amount limit value at a value obtained by adding a fixed value (−30% of the control duty, for example) by which the WGV can be pushed reliably to the fully closed position to the operation amount D.

Figure 6:
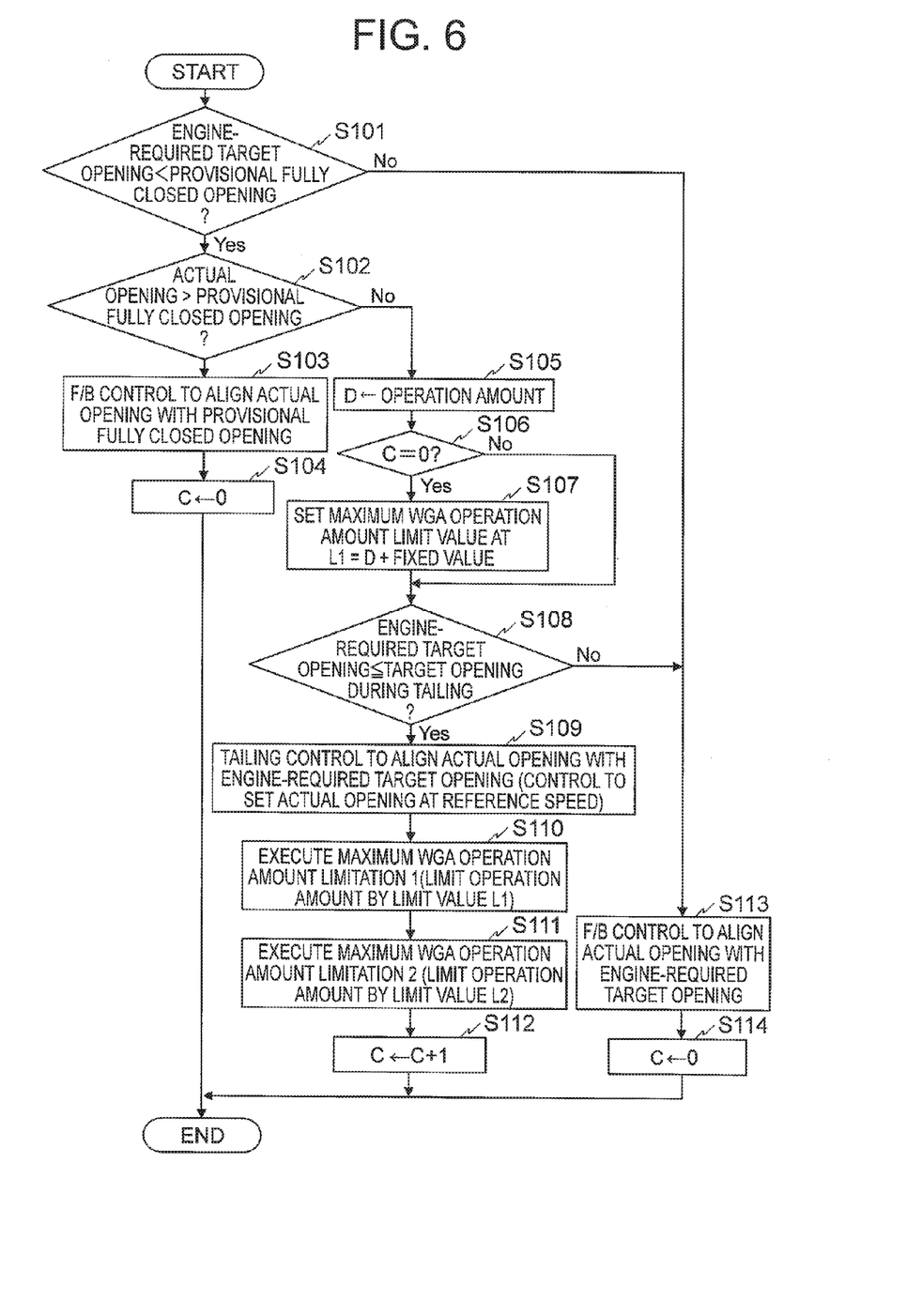
FIG. 6 is a flowchart illustrating a series of operations performed by the control apparatus for an internal combustion engine according to the first embodiment of the present invention.

Next, operations of the control apparatus for an internal combustion engine according to the first embodiment will be described using a flowchart. FIG. 6 is a flowchart illustrating a series of operations performed by the control apparatus for an internal combustion engine according to the first embodiment of the present invention.

In step S101, the control apparatus 50 compares the engine-required target opening Sv with the provisional fully closed opening in order to determine whether or not the engine-required target opening Sv is smaller than the "provisional fully closed opening", i.e. an opening at which, when variation in the fully closed position and the temperature characteristic are taken into account, the true WGV opening may correspond to the fully closed position.

Here, when "engine-required target opening Sv<provisional fully closed opening" is established, the control apparatus 50 determines that the true WGV opening is an opening that may correspond to the fully closed position, and advances to processing of step S102. When "engine-required target opening Sv<provisional fully closed opening" is not established, on the other hand, the control apparatus 50 advances to processing of step S113.

Having advanced to step S102, the control apparatus 50 compares the actual opening Pv with the provisional fully closed opening to determine whether or not the actual opening Pv is larger than the provisional fully closed opening.

Here, when "actual opening Pv>provisional fully closed opening" is established, the control apparatus 50 determines that the true WGV opening is not an opening that may correspond to the fully closed position, and advances to processing of step S103. When "actual opening Pv>provisional fully closed opening" is not established, on the other hand, the control apparatus 50 advances to processing of step S105.

Having advanced to step S103, the control apparatus 50 performs feedback control so that the actual opening Pv reaches the provisional fully closed opening, and then advances to processing of step S104. In other words, the control apparatus 50 executes feedback control using the provisional fully closed opening as the target opening.

Next, in step S104, the control apparatus 50 resets a counter C, which is used in step S106, to be described below, to determine whether or not to set the maximum WGA operation amount limit value, at an initial value of 0, and then terminates the series of processes.

Having advanced from step S102 to step S105, meanwhile, the control apparatus 50 reads the current operation amount D, which is used in step S107, to be described below, as a reference for setting the maximum WGA operation amount limit value, and then advances to processing of step S106.

Next, in step S106, the control apparatus 50 determines whether or not to perform initial setting or updating of the maximum WGA operation amount limit value on the basis of the operation amount D read in step S105 by determining whether or not the value of the counter C is 0.

More specifically, when the counter C is set at the initial value of 0 in step S104 or step S114, the control apparatus 50 determines that the first condition, in which "the engine-required target opening Sv is not greater than the provisional fully closed opening and the actual opening Pv is greater than the provisional fully closed opening", has switched to the second condition, in which "the engine-required target opening Sv is not greater than the provisional fully closed opening and the actual opening Pv is not greater than the provisional fully closed opening", and advances to processing of step S107.

When the counter C is not at 0, on the other hand, the control apparatus 50 determines that a control period in which the actual opening Pv is set at the preset reference speed is underway following the switch, and therefore advances to processing of step S108 without updating a maximum WGA operation amount limit value L, i.e. using a previous value thereof.

Having advanced to step S107, the control apparatus 50 sets a maximum WGA operation amount limit value L1 on the basis of the operation amount D read in step S105, and then advances to the processing of step S108. More specifically, the control apparatus 50 sets a value obtained by adding a fixed value (−30% of the control duty, for example) to the operation amount D read in step S105 as the maximum WGA operation amount limit value L1.

Having advanced to step S108, the control apparatus 50 compares the target opening set during tailing control, in which the actual opening PV is set at the reference speed, with the engine-required target opening Sv to determine whether or not to continue the tailing control.

When the condition "engine-required target control Sv≤target opening during tailing" is established, the control apparatus 50 determines that the tailing control is to be continued, and advances to processing of step S109. When the condition is not established, on the other hand, the control apparatus 50 advances to the processing of step S113.

By executing the determination of step S108, the control apparatus 50 realizes switch control as follows. To ensure that the WGV does not exceed the collision limit speed after the first condition switches to the second condition, the control apparatus 50 implements tailing control on the target opening so that the actual opening Pv remains at the reference speed. When the engine-required target opening Sv varies to the open side beyond the target opening set during the tailing control, on the other hand, the control apparatus 50 immediately cancels the tailing control and implements control to switch to an open side operation performed through normal feedback control.

In step S109, the control apparatus 50 implements control so that the actual opening Pv varies at the reference speed until the actual opening reaches the engine-required target opening Sv, thereby ensuring that the WGV does not exceed the collision limit speed.

Next, in step S110, the control apparatus 50 executes a maximum operation amount limitation 1 using the maximum WGA operation amount limit value L1 set in step S107.

Next, in step S111, the control apparatus 50 executes a maximum operation amount limitation 2 using a maximum limit value L2 set in advance as an operation amount at which the motor is not damaged even when used continuously over a long period of time.

Next, in step S112, the control apparatus 50 adds 1 to the counter C used in step S106 to determine whether or not to set the maximum WGA operation amount limit value, and then terminates the series of processes.

Meanwhile, having advanced from step S101 or step S108 to step S113, the control apparatus 50 implements normal feedback control to set the actual opening at the engine-required target opening, and then advances to the processing of step S114.

Next, in step S114, the control apparatus 50 resets the counter C used in step S106 to determine whether or not to set the maximum WGA operation amount limit value at the initial value of 0, and then terminates the series of processes.

With the control apparatus for an internal combustion engine according to the first embodiment, as described above, the WGA operation amount used to drive the WGV to the fully closed position can be limited by an optimum value in accordance with the operating conditions.

Further, in a region where the actual opening is open, or in other words a region on the open side of an opening at which, due to the temperature characteristic of the sensor and so on, the true opening may correspond to the fully closed position, the operation amount is not limited. Hence, in a region where there is a large deviation between the target opening and the actual opening, the WGA can be driven by the maximum operation amount, and as a result, a reduction in responsiveness during a transition can be prevented.

More specifically, the control apparatus for an internal combustion engine according to the present invention is configured to drive the WGV to the fully closed position by initially driving the WGA in the direction of the preset provisional fully closed opening, and once the speed of the WGV has decreased after the actual opening reaches the provisional fully closed opening, switching the target opening to the fully closed position and reaccelerating the WGV. Here, the provisional fully closed opening is set as an opening corresponding to an upper limit position of a variation range of the operating position in which the WGV completely blocks the exhaust bypass passage.

As a result, it is possible to provide a control apparatus for an internal combustion engine with which the WGV can be prevented from crashing into the fully closed position when driven at a high speed exceeding the collision limit speed, a full closing operation can be performed reliably on the WGV while ensuring that the WGV does not crash into the fully closed position at high speed, and the motor can be prevented from overheating abnormally due to an excessive WGA drive current.

Further, the control apparatus for an internal combustion engine according to the present invention is configured to calculate the WGA operation amount and drive the WGA such that the actual opening is aligned with the engine-required target opening after the actual opening reaches the provisional fully closed opening during the period in which the first condition is established, and to calculate the WGA operation amount at this time so that the actual opening varies toward the engine-required target opening at the reference speed. Hence, the WGV can be reliably prevented from exceeding the collision limit speed again after being reaccelerated during the feedback control executed after switching to the period in which the second condition is established, and as a result, the full closing operation can be performed even more reliably.

Furthermore, the control apparatus for an internal combustion engine according to the present invention is configured to be capable of setting the maximum WGA operation amount limit value at an optimum value in response to variation in the optimum WGA operation amount according to the operating conditions during an operation to drive the WGV to the fully closed position. Here, the WGA operation amount can be set and varied at intervals of a preset control period, and the WGA is driven by continuously applying thereto a control amount corresponding to a current-controlling output voltage duty, for example.

When the maximum WGA operation amount limit value is set univocally regardless of the operating conditions and priority is given to ensuring that the full closing operation is performed reliably, the maximum limit value must be set at a maximum value, making it impossible to suppress an excessive operation amount. As a result, a deviation may occur in the WGA position sensor due to abnormal overheating of the motor and bending of the link mechanism.

Conversely, when priority is given to suppressing an excessive operation amount, the maximum limit value must be set at a minimum value, and therefore priority can no longer be given to ensuring that the full closing operation is performed reliably. As a result, the WGV may be pushed back by the exhaust pressure so that the WGV cannot be maintained in the fully closed position, leading to a reduction in responsiveness.

In the present invention, on the other hand, the maximum WGA operation amount limit value is set at an optimum value in accordance with the operating conditions, and therefore the problems described above can be avoided.

Moreover, the maximum WGA operation amount limit value is activated only in the region where the true WGV opening is an opening that may correspond to the true closed position, or in other words the region where the second condition is established. Therefore, in a region where the actual opening is open, the WGA can be driven at the maximum WGA operation amount, and as a result, the responsiveness does not decrease.

Further, the control apparatus for an internal combustion engine according to the present invention is configured to set a second maximum operation amount limit value as a maximum operation amount value at which the motor is not damaged, envisaging a case in which the WGV target opening is set at the fully closed position continuously for a long period of time, whereby the operation amount can be limited during the period in which the second condition is established. Hence, the operation amount can be limited by the second maximum operation amount limit value in a case where an abnormally large value is set erroneously as the maximum operation amount limit value determined on the basis of the operation amount at the point where a state in which the first condition is established switches to a state in which the second condition is established, and as a result, abnormal overheating of the motor can be avoided.

Furthermore, when control is performed using the vicinity of the fully closed position as the target opening in a condition where the actual WGV operating position deviates from the operating position perceived during the control due to temperature drift in the output characteristic of the WGV position sensor and so on, the detection value of the WGV position sensor may not indicate the fully closed position, and therefore the WGA operation amount may be increased in a direction heading toward the fully closed position even though the true WGV opening already abuts the fully closed position.

Likewise in this case, the WGA operation amount is increased continuously, and therefore an excessive motor current may be applied to the WGA continuously, leading to abnormal overheating of the motor. With the control apparatus for an internal combustion engine according to the present invention, however, engine burnout can be avoided likewise in this case by setting the second maximum operation amount limit value.

What is claimed is:

1. A control apparatus for an internal combustion engine, comprising:
   a turbocharger that has a turbine provided in an exhaust passage of the internal combustion engine and a compressor provided in an intake passage of the internal combustion engine so as to rotate integrally with the turbine;
   a wastegate valve that is provided in an exhaust bypass passage connecting an upstream side to a downstream side of the turbine so as to adjust a flow rate of exhaust gas from the internal combustion engine as the exhaust gas flows through the exhaust bypass passage;
   an actuator that is driven to modify an opening position of the wastegate valve;
   a position sensor that detects the opening position of the wastegate valve;
   a supercharging pressure sensor that detects an actual supercharging pressure, which is an actual value of a pressure of intake air compressed by the compressor; and
   a controller that detects an operating condition of the internal combustion engine on the basis of detection results from a group of sensors including the position sensor and the supercharging pressure sensor, and controls the actual supercharging pressure by driving the actuator on the basis of the operating condition,
   wherein the controller, when driving the wastegate valve to a fully closed opening, initially drives the actuator toward a preset provisional fully closed opening, and after determining on the basis of a detection result from the position sensor that an actual opening of the wastegate valve has reached the provisional fully closed opening, switches a target opening to the fully closed opening and drives the actuator accordingly.

2. The control apparatus for an internal combustion engine according to claim 1, wherein the controller comprises:
   a target supercharging pressure calculation unit that calculates a target supercharging pressure, which is a target value of the pressure of the intake air compressed by the compressor, on the basis of the operating condition of the internal combustion engine;
   an engine-required target opening calculation unit that calculates an engine-required target opening of the wastegate valve, which is required to align the actual supercharging pressure with the target supercharging pressure;
   an actual opening calculation unit that sets an operating position, in which the wastegate valve completely blocks the exhaust bypass passage, as a reference position of the wastegate valve, and converts the operating position of the wastegate valve, detected by the position sensor, into the actual opening of the wastegate valve on the basis of the reference position;
   an actuator operation amount calculation unit that calculates an actuator operation amount on the basis of comparison results of magnitude relationships obtained by comparing the engine-required target opening and the actual opening respectively with the provisional fully closed opening; and
   an actuator driving unit that outputs the actuator operation amount to the actuator,
   wherein the actuator operation amount calculation unit calculates, as the actuator operation amount, an operation amount required to align the actual opening with the provisional fully closed opening on the basis of the provisional fully closed opening and the actual opening when a first condition, in which the engine-required target opening is not greater than the provisional fully closed opening and the actual opening is greater than the provisional fully closed opening, is established, and
   calculates, as the actuator operation amount, an operation amount required to align the actual opening with the engine-required target opening on the basis of the engine-required target opening and the actual opening when a second condition, in which the engine-required target opening is not greater than the provisional fully closed opening and the actual opening is not greater than the provisional fully closed opening, is established.

3. The control apparatus for an internal combustion engine according to claim 2, wherein the provisional fully closed opening is set in advance as an opening obtained by converting an upper limit position of a variation range of the operating position in which the wastegate valve completely blocks the exhaust bypass passage on the basis of the reference position.

4. The control apparatus for an internal combustion engine according to claim 2, wherein, when a state in which the first condition is established switches to a state in which the second condition is established, the actuator operation amount calculation unit calculates the actuator operation amount such that the actual opening shifts toward the engine-required target opening at a preset reference speed until the actual opening reaches the engine-required target opening.

5. The control apparatus for an internal combustion engine according to claim 3, wherein, when a state in which the first condition is established switches to a state in which the second condition is established, the actuator operation amount calculation unit calculates the actuator operation amount such that the actual opening shifts toward the engine-required target opening at a preset reference speed until the actual opening reaches the engine-required target opening.

6. The control apparatus for an internal combustion engine according to claim 2, wherein the controller further comprises an actuator operation amount limit value calculation unit that calculates a first maximum limit value of the actuator operation amount on the basis of the actuator operation amount calculated when the state in which the first condition is established switches to the state in which the second condition is established, and
the actuator operation amount calculation unit limits the actuator operation amount by the first maximum limit value during a period in which the second condition is established.

7. The control apparatus for an internal combustion engine according to claim 3, wherein the controller further comprises an actuator operation amount limit value calculation unit that calculates a first maximum limit value of the actuator operation amount on the basis of the actuator operation amount calculated when the state in which the first condition is established switches to the state in which the second condition is established, and
the actuator operation amount calculation unit limits the actuator operation amount by the first maximum limit value during a period in which the second condition is established.

8. The control apparatus for an internal combustion engine according to claim 4, wherein the controller further comprises an actuator operation amount limit value calculation unit that calculates a first maximum limit value of the actuator operation amount on the basis of the actuator operation amount calculated when the state in which the first condition is established switches to the state in which the second condition is established, and
the actuator operation amount calculation unit limits the actuator operation amount by the first maximum limit value during a period in which the second condition is established.

9. The control apparatus for an internal combustion engine according to claim 5, wherein the controller further comprises an actuator operation amount limit value calculation unit that calculates a first maximum limit value of the actuator operation amount on the basis of the actuator operation amount calculated when the state in which the first condition is established switches to the state in which the second condition is established, and
the actuator operation amount calculation unit limits the actuator operation amount by the first maximum limit value during a period in which the second condition is established.

10. The control apparatus for an internal combustion engine according to claim 2, wherein, when a condition in which the actual opening is not greater than the provisional fully closed opening is established, the actuator operation amount calculation unit limits the actuator operation amount by a preset second maximum limit value, which is an operation amount that does not cause damage to the actuator even when applied continuously for at least a preset allowable time.

11. The control apparatus for an internal combustion engine according to claim 3, wherein, when a condition in which the actual opening is not greater than the provisional fully closed opening is established, the actuator operation amount calculation unit limits the actuator operation amount by a preset second maximum limit value, which is an operation amount that does not cause damage to the actuator even when applied continuously for at least a preset allowable time.

12. The control apparatus for an internal combustion engine according to claim 4, wherein, when a condition in which the actual opening is not greater than the provisional fully closed opening is established, the actuator operation amount calculation unit limits the actuator operation amount by a preset second maximum limit value, which is an operation amount that does not cause damage to the actuator even when applied continuously for at least a preset allowable time.

13. The control apparatus for an internal combustion engine according to claim 5, wherein, when a condition in which the actual opening is not greater than the provisional fully closed opening is established, the actuator operation amount calculation unit limits the actuator operation amount by a preset second maximum limit value, which is an operation amount that does not cause damage to the actuator even when applied continuously for at least a preset allowable time.

14. The control apparatus for an internal combustion engine according to claim 6, wherein, when a condition in which the actual opening is not greater than the provisional fully closed opening is established, the actuator operation amount calculation unit limits the actuator operation amount by a preset second maximum limit value, which is an operation amount that does not cause damage to the actuator even when applied continuously for at least a preset allowable time.

15. The control apparatus for an internal combustion engine according to claim 7, wherein, when a condition in which the actual opening is not greater than the provisional fully closed opening is established, the actuator operation amount calculation unit limits the actuator operation amount by a preset second maximum limit value, which is an operation amount that does not cause damage to the actuator even when applied continuously for at least a preset allowable time.

16. The control apparatus for an internal combustion engine according to claim 8, wherein, when a condition in which the actual opening is not greater than the provisional fully closed opening is established, the actuator operation amount calculation unit limits the actuator operation amount by a preset second maximum limit value, which is an operation amount that does not cause damage to the actuator even when applied continuously for at least a preset allowable time.

17. The control apparatus for an internal combustion engine according to claim 9, wherein, when a condition in which the actual opening is not greater than the provisional fully closed opening is established, the actuator operation amount calculation unit limits the actuator operation amount by a preset second maximum limit value, which is an operation amount that does not cause damage to the actuator even when applied continuously for at least a preset allowable time.

18. A control method for an internal combustion engine, which is executed by an actuator operation amount calculation unit of a control apparatus for the internal combustion engine, the control apparatus including:

a turbocharger that has a turbine provided in an exhaust passage of the internal combustion engine and a compressor provided in an intake passage of the internal combustion engine so as to rotate integrally with the turbine;

a wastegate valve that is provided in an exhaust bypass passage connecting an upstream side to a downstream side of the turbine so as to adjust a flow rate of exhaust gas from the internal combustion engine as the exhaust gas flows through the exhaust bypass passage;

an actuator that is driven to modify an opening position of the wastegate valve;

a position sensor that detects the opening position of the wastegate valve;

a supercharging pressure sensor that detects an actual supercharging pressure, which is an actual value of a pressure of intake air compressed by the compressor;

a target supercharging pressure calculation unit that calculates a target supercharging pressure, which is a target value of the pressure of the intake air compressed by the compressor, on the basis of an operating condition of the internal combustion engine;

an engine-required target opening calculation unit that calculates an engine-required target opening of the wastegate valve, which is required to align the actual supercharging pressure with the target supercharging pressure;

an actual opening calculation unit that sets an operating position, in which the wastegate valve completely blocks the exhaust bypass passage, as a reference position of the wastegate valve, and converts the operating position of the wastegate valve, detected by the position sensor, into an actual opening of the wastegate valve on the basis of the reference position;

the actuator operation amount calculation unit, which calculates an actuator operation amount on the basis of comparison results of magnitude relationships obtained by comparing the engine-required target opening and the actual opening respectively with a preset provisional fully closed opening; and an actuator driving unit that outputs the actuator operation amount to the actuator, the control method comprising:

a first step for setting the provisional fully closed opening in advance as an opening obtained by converting an upper limit position of a variation range of the operating position in which the wastegate valve completely blocks the exhaust bypass passage on the basis of the reference position;

a second step for determining whether or not a first condition, in which the engine-required target opening is not greater than the provisional fully closed opening and the actual opening is greater than the provisional fully closed opening, is established;

a third step for calculating, as the actuator operation amount, an operation amount required to align the actual opening with the provisional fully closed opening on the basis of the provisional fully closed opening and the actual opening during a period in which the first condition is determined to be established in the second step;

a fourth step for determining whether or not a second condition, in which the engine-required target opening is not greater than the provisional fully closed opening and the actual opening is not greater than the provisional fully closed opening, is established; and a fifth step for calculating, as the actuator operation amount, an operation amount required to align the actual opening with the engine-required target opening on the basis of the engine-required target opening and the actual opening during a period in which the second condition is determined to be established in the fourth step.

* * * * *